US 6,980,691 B2

United States Patent
Nesterov et al.

(12) 
(10) Patent No.: US 6,980,691 B2
(45) Date of Patent: Dec. 27, 2005

(54) CORRECTION OF "RED-EYE" EFFECTS IN IMAGES

(75) Inventors: Victor Anatol'evich Nesterov, Saint Petersburg (RU); Vladimir Alezandrovich Khvatov, St. Petersburg (RU); Leonid Borisovich Lalyko, Saint Petersburg (RU); Kryzstof Antoni Zaklika, Saint Paul, MN (US)

(73) Assignee: Corel Corporation, Ottawa (CA)

( * ) Notice: Subject to any disclaimer, the term of this patent is extended or adjusted under 35 U.S.C. 154(b) by 722 days.

(21) Appl. No.: 09/899,572

(22) Filed: Jul. 5, 2001

(65) Prior Publication Data
US 2003/0007687 A1    Jan. 9, 2003

(51) Int. Cl.⁷ .............................................. G06K 9/00
(52) U.S. Cl. ..................... 382/165; 382/103; 382/117
(58) Field of Search .......... 382/117, 162–167; 358/518–523; 348/576–577

(56) References Cited

U.S. PATENT DOCUMENTS

| | | | |
|---|---|---|---|
| 5,130,789 A | 7/1992 | Dobbs et al. ................. 385/75 |
| 5,432,863 A | 7/1995 | Benati et al. ................. 382/167 |
| 5,748,764 A | 5/1998 | Benati et al. ................. 382/117 |
| 5,892,837 A | 4/1999 | Luo et al. ..................... 382/117 |
| 5,990,973 A | 11/1999 | Sakamoto .................... 348/576 |
| 6,009,209 A | 12/1999 | Acker et al. .................. 382/275 |
| 6,016,354 A | 1/2000 | Lin et al. ..................... 382/117 |
| 6,027,263 A | 2/2000 | Tawa .......................... 396/655 |
| 6,072,893 A | 6/2000 | Luo et al. ..................... 382/117 |
| 6,124,339 A | 9/2000 | Huang et al. ................. 514/407 |
| 6,144,754 A * | 11/2000 | Okano et al. ................. 382/117 |
| 6,151,403 A | 11/2000 | Luo ............................. 382/117 |
| 6,204,858 B1 | 3/2001 | Gupta .......................... 345/431 |
| 6,631,208 B1 * | 10/2003 | Kinjo et al. .................. 382/167 |

FOREIGN PATENT DOCUMENTS

| | | | | |
|---|---|---|---|---|
| EP | 0899686 A2 | 3/1999 | ............ | G06T 7/00 |
| EP | 0961225 A2 | 12/1999 | ............ | G06T 7/00 |
| EP | 0989517 A2 | 3/2000 | ............ | G06T 5/50 |

OTHER PUBLICATIONS

Patti, A., et al. "Automatic Digital Redeye Reduction," *International Conference Image Proc. ICIP98*, vol. 3 (1998); 55-59.

Lim, T. S., et al. "A Comparison of Prediction Accuracy, Complexity, and Training Time of Thirty-three Old and New Classification Algorithms," *Machine Learning Journal* vol. 40 (2000); 1-27.

Sung, K. K. "Learning and Example Selection for Object and Pattern Detection," *Technical Report—AITR* vol. 1572 (2000); 1-195.

* cited by examiner

*Primary Examiner*—Jingge Wu
(74) *Attorney, Agent, or Firm*—Hensley Kim & Edgington, LLC

(57) ABSTRACT

After identification of an image or image area where correction is to be effected for red-eye defects, and identification of eye regions within the image or the image area, color data from the area is provided, collected or analyzed according to color channel information. The color channel information may be defined for specific or collections of wavelength values or color content values, usually with at least two channels, up to four or more color channels used to carry all of the information (and with digital images, pixel information) for each color. By using color channel information, local color content information can be readily accessed and evaluated, and after the exact nature or degree of a red-eye effect is determined from evaluation of the color channel information, the data may be readily corrected by a number of different techniques. Templates of colors and/or templates for features (such as glint, pigmentation, or artistic features) may be added to identified regions to be corrected for red-eye

32 Claims, No Drawings

CORRECTION OF "RED-EYE" EFFECTS IN IMAGES

BACKGROUND OF THE INVENTION

1. Field of the Invention

The invention relates to adjusting color in digital images, particularly color defects, and particularly "red-eye" defects in color images of animals, including humans. The invention relates to software programs and data transmission effects for correcting "red-eye" defects, as opposed to imaging process corrections or flash corrections to diminish the original occurrence of the "red-eye" phenomenon.

2. Background of the Art

Photographs of people taken with a camera using flash often exhibit a phenomenon called red-eye. The effect is caused by reflection of the camera flash from the back of the eye. Typically the pupil of the eye develops a greater or lesser degree of red color. However, other colors can occur (such as gold-eye) and the effect may be sufficiently intense to eliminate all detail in the eye so that the pupil and iris cannot be distinguished, forming a single red blob. The likelihood of red-eye is increased when the eye is dark-adapted and the pupil is wide open, which represents a precisely the low light situation that requires flash illumination. In such a case, the pupil does not have time to close before a reflection occurs from the back of the eye. The effect is further increased for inexpensive or compact cameras having a flash mounted close to the axis of the lens, which increases the likelihood that reflected light will enter the lens. When the camera is moved away from the subject, the likelihood of red-eye increases, since the flash and lens become more nearly colinear. This has the unfortunate effect that the most pronounced red-eye can occur when the eye is small compared to the size of the image, and so is hardest to correct. Further impediments to correction result, for instance, from reflections caused by contact lenses. Correction is, however, strongly desired because of the unnatural and distracting look of red-eye.

Animals also show an effect similar to red-eye in humans and in pictures of pets, which are often treated as members of the family, the effect is common enough to require correction. However, the effect in animals—despite the name red-eye—can have a very broad range of appearance, with colors such as red, orange, yellow, brown, beige, cream, gray, green, cyan or blue. In fact, a given animal in a photograph can have one eye of one color and one of another. While in humans viewed face-on the pupil can be considered round region centered in a round iris, this is not the case for animals. Animal pupils are generally much larger than human ones, so the iris can be invisible. Furthermore, the pupil is frequently not circular as, for instance, in the case of the almond-shaped pupil of a cat, and portions of the eye are often obscured by fur. These characteristics make it extremely difficult to correct the red-eye effect in animals. For this reason, prior methods of detecting and correcting red-eye have generally restricted themselves to human red-eye.

Most methods rely on using the redness of the pupil region to determine the part of the image requiring correction. Correction of the pupil is typically accomplished by desaturating the red region according to some recipe, usually involving some form of special treatment of areas near the periphery of the pupil so that the correction blends well with the rest of the image. Thus U.S. Pat. No. 5,130,789 selects pixels whose chrominance component falls within an elliptical chrominance region, for which the major axis of the ellipse coincides with the saturation direction of the chrominance plane and the minor axis coincides with the hue direction. The chrominance component of such pixels is modified to a destination chrominance value, based upon where the chrominance value of the sample of interest falls. The luminance component is modified by an offset based upon the difference in the value of the luminance component of the target color and that of the new color. This luminance value difference is weighted in accordance with the product of the previously determined chrominance weighting coefficient and a prescribed relationship between the geometrical location of the luminance component for the sample of interest and the extent of a prescribed range of luminance variation projected from the elliptical discriminator along the luminance axis of the YIQ coordinate system. U.S. Pat. No. 5,432,863 selects candidate red-eye regions based on a plurality of color threshold values which are representative of eye color defects, segmenting the image on this basis, and deriving a probability score of red-eye. Subsequently the region with the optimal score is selected and a test is applied whether a second eye is present in a predetermined spatial relationship to the first. Correction is accomplished by desaturating the red-eye area and lowering its lightness. A similar approach is disclosed in U.S. Pat. No. 5,748,764. According to U.S. Pat. No. 5,990,973 an operator designates an approximate red-eye region which is subsequently refined using the reddest pixel within this region. Subsequently a second eye is detected using a similar refinement method. Though the claims include an "image synthesis means for . . . outputting an image whose red-eye area has been corrected to a natural pupil color", the patent does not teach any such correction method.

U.S. Pat. No. 6,016,354 describes a red-eye reduction system that includes a masking module. The masking module converts an image into a mask having first state areas representing red color pixels of the image and second state areas representing other color pixels of the image. The image includes an eye with a red pupil. A pupil locating module is coupled to the masking module to locate a substantially first state area in the mask that resembles a pupil. A color replacing module is then coupled to the pupil locating module to change the red color pixels in the area into monochrome (gray) or other predefined colors. The color replacing module also adjusts the boundary of the area by changing the colors of pixels in close proximity to the area if the color of these pixels is determined to be sufficiently close to red such that natural appearance of the eye is maintained when reducing the red pupil. A method of reducing red-eye effect in a digital image is also described. The method is also described in "Automatic digital red-eye reduction", A. Patti, K. Konstantinides, D. Tretter and L. Qian, Proc. 1998 *Internat. Conf. Image Proc. ICIP98*, v.3, p.55–9 (1998). In WO 9917254 is described a method that tests pixel colors against upper and lower thresholds in hue, saturation and lightness for membership in a red-eye class. To improve performance, a requirement of a 1:1 aspect ratio can additionally be used to for the red-eye region. Correction is with a weighted function based on the darkest of the R, G and B channels in the red-eye region.

U.S. Pat. No. 6,204,858 describes a method for adjusting color values of pixels of an image to reduce a red-eye effect, the method comprising: generating a red-enhanced value for each pixel in the image, wherein the red-enhanced value of a pixel represents the degree of redness of the pixel; convolving a plurality of spatial filters with the red-enhanced values to create one or more red filter values, each of the one or more red filter values corresponding to a pixel region having a specific shape and size; identifying a pixel region having a shape and size defined by at least one of the plurality of spatial filters as a red-eye pixel region if the corresponding red filter value exceeds a predetermined threshold; and adjusting the color values of the red-eye pixel region to reduce the red-eye effect. The method may be practiced wherein generating a red-enhanced value for each pixel comprises: categorizing each pixel in the image as a non-red pixel or a red pixel; assigning a minimum red-enhanced value to each non-red pixel; and calculating a red-enhanced value for each red pixel, wherein the red-enhanced value represents a degree of redness of the pixel.

These methods, relying as they do on redness, are not useful for correcting red-eye in animals. Methods that require the presence of two eyes fail for profile shots in which only one eye is visible. Template methods are time-consuming and also have difficulty with profile shots, since perspective ensures the eye no longer matches the round template. Even when eyes can be assumed circular, such methods are easily confused by, for instance, red glass ornaments on a Christmas tree.

When it is desired to automate red-eye detection, methods such as those mentioned above are insufficiently reliable. Approaches to improving reliability generally make use of additional knowledge such as anthropometric criteria. Thus, for example, U.S. Pat. No. 5,892,837 teaches a method where an operator first approximately enters the locations of two eye and these locations are subsequently refined by means of a search using multi-size templates. Candidate eye positions are scored on the basis of the quality of the match with the template, conformance to a specific ratio of eye size to the separation between the eyes, and symmetrical relationship. U.S. Pat. No. 6,072,893 describes a similar procedure. Neither patent teaches a method of correction. Eur. Pat. 961,225 claims a method for detecting eye color defects of a subject in an image due to flash illumination, the method comprising the steps of: (a) detecting a skin colored region in a digital image; (b) determining if the skin colored region has a predetermined characteristic of a human face; (c) detecting a pair of candidate redeye defects in or adjacent to the human face based on comparing a characteristic of the candidate redeye defects to a characteristic of the detected human face; and (d) selecting the candidate redeye defects as actual redeye defects based on the results of step (c). Many different restrictions are used in finding the eyes, including absolute size, separation between eyes in a pair, symmetry of this pair and the like, but the main search is conducted in a color channel which is formed as the red color channel minus the larger of the green and blue color channels. Eur. Pat. 899,686 discloses a similar procedure. Neither of these patents teaches a method of correcting the red-eye after it is found. While the above procedures may increase reliability of red-eye detection for humans they are unsuitable for animal eyes since few animals are skin colored and the form and position of animal eyes is widely variable and different to that in humans.

Some other prior art methods do not use the color of the eye as explicitly as the procedures described above. For example, in the Ph.D. Thesis of K. K. Sung (Artificial Intelligence Laboratory, Massachusetts Institute of Technology, Technical Report: AITR-1572, 1996) entitled "Learning and Example Selection for Object and Pattern Detection" there is described a method of human eye detection using neural networks. The network is trained with an eye template that is distorted by the operator until satisfactory eye recognition rates are achieved for these training images. The network is now capable of classifying eye images it has not encountered before. However, the method has difficulty handling eyes of arbitrary size and orientation and is unsuitable for detecting animal eyes, which show much wider variation than those of humans. Moreover, the method simply detects eyes and not just those eyes with the red-eye effect.

U.S. Pat. No. 6,009,209 describes a method in a computer system for automatically editing a color image to remove discoloration of the image caused by a red eye artifact. The method comprises the steps of: identifying attributes of the red eye artifact; defining regions of the red eye artifact based on the identified attributes; selecting a color for re-coloring each region of the red eye artifact based on predetermined criteria for each of the regions; and re-coloring each of the regions with the associated selected colors. Such a method of correction is not applicable to animal red-eye and, moreover, cannot cope with eyes that are partially obscured, for instance by eyelids or hair. European Pat. 989,517 discloses a method for detecting both human eyes and animal eyes by taking advantage of the red-eye effect. Two images are obtained, one with flash and one without, and the difference image is used to locate the red-eye signal, which represents the eye position. It is stated that "when the location of human eyes are determined, the method scans for pairs of regions that have high intensity pixel values, particularly in the red channel. In the case that animal eyes are to be located in a captured image frame, the method scans for regions of high intensity values particularly in the green channel.". As noted earlier, because of the wide variation in animal red-eye colors this procedure will not be reliable for animals. Further, since the method requires two images to be acquired, it is useless for finding eyes in pre-existing images.

A digital image is a raster of rows and columns of picture elements, or "pixels", each of which include information such as color data. Color data describes the pixel color using any of a variety of color systems. For example, in the RGB (red-green-blue) system, colors are represented as a combination of red, green, and blue components. Color data for a pixel thus includes numerical values reflecting the intensities of the red, green, and blue components of the pixel color. Other color systems include CMYK (cyan-magenta-yellow-key[usually black]) and HSV (hue-saturation-value), which similarly represent colors as combinations of their respective color components.

Numerous technical applications exist that allow a user to adjust the color of a digital image. In some applications, the user can manually adjust the color of a pixel by methods such as replacing the existing color data with the desired color data, enhancing or reducing a specified color component, or mixing the existing color data with color data for another color. However, it can be a time consuming process for the user to identify specific pixels and to adjust the color data of those pixels until the desired color is achieved.

Photographing a person in a relatively dark environment requires additional lighting, such as flash lighting to avoid under-exposure. The use of flash lighting, however, often results in a person's eyes being red in the photograph, giving the person an unnatural look in the photograph with red, glowing eyes. In taking pictures of animals, a similar effect can be experienced, although the unnatural color effect may be green or blue or some other color, depending upon the optical and physical characteristics of the eye structure, and the nature of the flashlighting. This is still typically referred to as the "red-eye" phenomenon or simply red-eye, whatever the color distortion in the image.

The red-eye typically results from the animal's or person's pupils not being able to quickly adjust to the flashlight in darkness. As is known, the pupils of an animal are enlarged in a dark environment. When flashlight appears, the pupils are not able to reduce their sizes due to the suddenness of the flashlight. This typically causes the flashlight reflecting off the retina at the back of the eyes, causing red-eye. Additionally, extraneous side-lighting can cause a similar effect.

Several prior art techniques have been proposed to reduce the red-eye effect. These effects can be based on attempts to reduce the original conditions that cause red-eye (as by a pre-flash or series of pre-flashes to close the pupils) or by development or image color adjustments. A common prior art approach is to use multiple flashes in the camera to contract the pupils before a final flash is used to expose and capture the image. However, disadvantages are associated with this prior art approach. One disadvantage is the delay between the time when the first flashlight appears and the time when the picture is actually taken. This means the picture is taken several seconds after the exposure button has been pressed. This may cause confusion and the subjects may move away from the posed positions before the image is captured. Moreover, the red-eye problem still occurs when the user forgets to enable this feature of the camera during photographing, or when the camera is not equipped with such red-eye prevention feature. Further, this prior art approach cannot solve the red-eye problem in already-taken photos.

With the advance of image processing technologies, it is possible to digitize an image and store the digitized image in a computer system. This is typically done either using a digital camera to capture the image digitally, or using a scanner that converts the image into digital form. The digital image includes data representing image pixels arranged in a matrix. The data of the digital image are then stored in the computer. The digital image can be retrieved for display and can also be digitally altered in the computer.

Because images can now be captured as or converted into digital images, it is possible to correct the red-eye problem in an image digitally. Some prior art schemes have been proposed to correct the red-eye problem digitally. One such prior art scheme simply provides the user with means for manually painting over the red eyes digitally. The disadvantage of this prior art scheme is that some degree of painting skill is needed for the user to paint over the red eyes. Another disadvantage is that the correction of the red-eye is not done automatically, but must be performed manually.

Another prior art approach requires the user to precisely locate the center of a pupil so that a black circle is placed over the red-eye region. The disadvantage of this prior art approach is that the red-eye region is often not a circular region. This may cause portions of the red-eye region not to be covered by the black circle. In addition, the black circle may not be able to cover the peripheral area (i.e., the pink ring) of the red-eye region. Moreover, replacing the red pupil with a complete black circle may also cover the glint in the pupil. As is known, the glint in the pupil is usually a bright "white" spot. Thus, the result of this type of correction is often quite noticeable and undesirable, and sometimes destroys the natural appearance of the eyes in the image.

U.S. Pat. Nos. 6,151,403 and 6,124,339 describes a method for locating eyes in an image comprising a computer program product for locating first and second human eye objects each having substantially the same physical characteristics, and the ratio of the distance between the first and second human eye objects and the size of each human eye object is substantially invariant, the computer program product comprising: a computer readable storage medium having a computer program stored thereon for performing the steps of: (a) determining a potential flesh region in an intensity image; (b) determining valley regions in the intensity image for determining substantially non-flat regions with lower intensity values in a local area of the intensity image; (c) performing matching in the intensity image using an intensity-based template in a neighborhood of the valley regions within the flesh regions for determining a plurality of locations that give a desirable match of the human eye object relative to the template, said step of matching using cross-correlation to identify desirable locations; and (d) performing verification by mating a pair of potential human eye object candidates with desirable matching response to the template by using a plurality of verification criteria selected from the group including the orientation, proportion, profile, symmetry, and centrality of the paired human eye objects matched to the intensity-based template, wherein the verification criteria comprise finding the best pair of locations of human eye objects by computing figures of merit individually or in combination for the plurality of verification criteria, and wherein the figure of merit for orientation includes measuring the difference between an orientation of a line connecting the first and second human eye objects, and an average orientation of the first and second human eye objects.

U.S. Pat. No. 6,027,263 describes a physical system for removing red-eye from a printed or photographic image. A sheet having a transparent rub-on material of a selected color deposited thereon for transferring the material onto a printed photograph to cover an image of a pupil in an image of an eye having red-eye effect, wherein the selected color is selected to neutralize said red-eye effect when the material covers the image of the pupil. Other methods of digital red-eye editing, such as U.S. Pat. Nos. 6,016,354, 6,204,858 or 6,009,209, have previously been described.

Although these various methods of correcting red-eye effects contribute to improvements in images, they are variously time consuming, personnel intensive, of limited utility (e.g., do not presently correct "red-eye" defects in animals where the effect produces a color other than red), and are inconsistent in their effects. Additional or alternative methods of red-eye correction are therefore still desirable.

SUMMARY OF THE INVENTION

Red-eye defect pixels are determined automatically following approximate indication of the image region containing a red-eye defect or red-eye defects. The approximate indication serves to specify a general region of the image in which candidate red-eye pixels may be found rather than to specify the red-eye pixels themselves. The method of the invention classifies pixels into red-eye defect pixels and non-defect pixels. It teaches a method of selecting an image color channel or combination of image color channels for performing the classification most effectively, which method does not require prior knowledge of the actual color of the red-eye defect.

In view of the shortcomings of prior art methods for defining and correcting red-eye defect areas, it is an aspect of this invention to provide a method of automatically determining the region of a red-eye defect that is independent of the color of this defect, and to provide an adaptive method for refining the extent of a red-eye defect region in an image. A further aspect of this invention is to provide a method of reconstructing detail of an eye when this detail has been destroyed by the red-eye effect. Yet another aspect of this invention is to provide a means of correcting the red-eye effect both in humans and in animals. Still another aspect of this invention is to provide a simple method of changing the color of undamaged human eyes in a digital image.

These and other objectives of the invention are provided by a method of delineating a red-eye defect area in an image that is independent of the specific color of the red-eye defect; a method of delineating a red-eye defect area by repeated segmentation of an image using a ratio formed from the darkest channel and the brightest color channel in the search area; a method of improving the delineation of red-eye defect area by segmentation using automatic selection of one of several image information representations characterized either by the representations all tending to give a higher response value for the red-eye region than for the surroundings or by the representations all tending to give a lower response value for the red-eye region than for the surroundings; a method of reconstructing a the pupil, iris and glint of an eye subject to the red-eye effect when one or more, or even all, of these features are missing; and a method of changing the color of the iris of an undamaged eye that maintains the original brightness variation in the iris.

DETAILED DESCRIPTION OF THE INVENTION

A unique characteristic of the red-eye phenomenon is that it tends to be highly localized in images and, though the locality of that effect can be readily determined by visual inspection, detection by automatic and/or semi-automatic means is not straightforward. The effect is found essentially only in images of heads, especially images of heads that are intensely lit for the imaging process, and the effect is produced only in the eyes of the images of these heads. Despite this, other objects in the image are easily mistaken for eyes and colors such as those of human red-eye are often found elsewhere in the face. Additionally, the definition of the edge of a red-eye defect, where the effect is weak, is difficult to achieve with precision. Consequently, though a process for red-eye correction may be initiated by automatic localization of areas to be investigated its reliability is markedly improved by approximate manual or operator directed encapsulation or indication of areas to be investigated.

After identification of an image or image area where correction is to be effected, and during identification of eye regions within the image or the image area, color data from the area is provided, collected or analyzed according to color channel information. Color channels are paths or systems for the transfer or storage of information on color content. The paths may be defined for specific or collections of wavelength values or color content values, usually with at least two channels, up to four or more color channels used to carry all of the information (and with digital images, pixel information) for each color. The colors selected for individual color channels may include, depending to a great extent on the imaging medium scanned, imaged or printed, combinations of (red, yellow and blue), (red, blue and green), (cyan, magenta and yellow), and (cyan, magenta, yellow and black). Alternatively, color may be represented in opponent color spaces with a brightness or lightness axis and axes representing opponent colors, for instance red and green, or blue and yellow. By using color channel information, local color content information can be readily accessed and evaluated, and after the exact nature or degree or extent of a red-eye effect is determined from evaluation of the color channel information, the data may be corrected by a number of different techniques.

One general technique for practicing the present invention includes the following sequence of events. A region is marked as a red-eye candidate area, for example by clicking on a pixel within the eye or by applying a frame around the region of the image (usually a single eye) where the red-eye defect has been observed. As an option, a pixel outside of the area of pixels having similar color channel ratio content is selected either automatically or manually. This selection of a non-similar pixel may assist in defining a color channel ratio of pixels that need not or should not be addressed by treatment to correct the red-eye effect. This optional step assists in defining a boundary between an area to be treated (e.g., the pupil, or the combination of pupil and iris) and the area not to be treated (e.g., the iris, or the sclera). Using the approximate indication of the red-eye area, whether indicated as a single pixel or as a frame within which the red-eye entirely or partially exists, the computer or program classifies the region into red-eye and non-red-eye areas using specific relationships between color channels. The red-eye defect areas are thereby defined for subsequent correction.

Though the above technique for automatically classifying defect and non-defect pixels is novel and effective another technique for practicing the invention includes manually circumscribing the eye region so as to include at least all the pixels of the eye that require modification. Such a method is useful, for example, when the red-eye defect area is adjacent to another area indistinguishable from it in all color properties, e.g. red hair or a red scarf adjacent to a red-eye defect. This method is useful also when the red-eye defect is mostly obscured, for instance by hair or fur, or by a plant or fingers. Yet another situation in which the alternative technique may be employed is when it is desired to select an eye without any red-eye defect for modification of, for instance, the iris color, or the pupil darkness, or the size or position of the glint.

Whether by means of the first technique of automatic classification or by means of manually selecting at least all the eye pixels requiring modification, the result is a region defined as containing eye pixels requiring modification. However, it may happen that this region contains some number of pixels (usually a small number) of pixels that should not be modified. Such a situation may occur when e.g. hair, fur, eyelids, clothing or plant material partly obscure the eye. In such a case the invention provides a technique for refining the definition of which pixels require modification. Unlike other prior art methods, this novel technique does not require designation of individual pixels. Instead, an operator adjusts a control and the computer or program ensures that either more or fewer pixels are included in the set of pixels to be modified. The inventive concept is that, when the number of pixels in the set to be modified is reduced, the first pixels to be removed from the set are those that are least likely to form part of the eye. In this way, areas that contain at least all the eye pixels requiring modification may be refined to contain only the eye pixels requiring modification without any laborious individual selection of pixels to keep or discard.

Thus, a region of eye pixels requiring modification may be selected automatically from an initial indication or manually as a region containing at least all the pixels to be modified. This region of eye pixels may contain only eye pixels or it may, in some cases, contain other pixels in addition to eye pixels. Optionally, the region containing eye pixels may be refined to contain only eye pixels by the procedure previously described. Irrespective of which technique or combination of techniques was employed, the result is a region of eye pixels requiring modification.

The region of eye pixels requiring modification may be modified by the computer or program using any of several techniques. The choice of technique may be in the hands of an operator or, alternatively and preferably, the choice may be automatic, for example based on color characteristics of the pixels in the set of eye pixels requiring modification, optionally considering the spatial characteristics of the color distribution. Thus, for example, if it is determined that the region of eye pixels contains only pupil pixels (e.g. by comparison with pixels adjacent to but outside the set of defined eye pixels) then the pupil only is corrected by a method specific to pupil correction. Any method know in the art may be used, for example the well know technique of desaturating the color of the pupil region to produce shades of gray. If it is determined that the pupil contains no small area of very bright pixels it may be concluded that a glint is absent, whereupon an artificial or synthetic glint may be created, for example in the center of the pupil or at the brightest point of the pupil. In the event that the region of eye pixels is determined contain both pupil and iris (for example by spatial or other color clustering) either the color of the pupil may be changed (e.g. by desaturation) or the color or the iris may be changed (e.g. by hue rotation) or both may be modified. Such techniques are very effective on eyes with well defined details. However, the absence of detail makes it very difficult to determine what elements of eye structure (e.g. pupil, glint, iris, sclera) are present in the set of eye pixels requiring modification. Accordingly, an especially preferred embodiment of the invention includes a novel template-based technique for eye modification. This technique is capable of reconstructing absent eye detail (for example, caused by an extreme red-eye defect) yet is capable of utilizing detail where it is present. Such a technique, therefore, is desirably taken as a default, but not necessarily sole, method of correction.

During correction using the template method, a template is selected (e.g., the program may have a default template for insertion into the area of related or similar pixels or it may be selected by operator input) and the template is applied to the region within the frame to those areas of similar pixels that require adjustment for the red-eye defect or otherwise require modification. That template is applied to those areas identified in this process as requiring adjustment and upon reaching a satisfactory level of correction, the program or the operator saves the corrected image data information, which becomes part of the total data that is saved. The precise definition of the eye region obtained by classification (optionally with additional refinement) may also be saved, either separately with or without correction, or by means of insertion of the corrected region into the total image data.

These general elements of the invention will now be explained in more detail, starting with the classification of image pixels into red-eye defect pixels and non-defect pixels. The classification is achieved by the process of segmentation, which is one that divides the image into a set of pixels (usually, but not necessarily, contiguous) of one kind (e.g. red-eye pixels) and a set of another kind (e.g. non-defect pixels). It is well know to practitioners of the art that segmentation may give rise to more than two sets of pixels. In some cases this may be desirable and in other cases not. The number of sets obtained depends on the conditions imposed on the segmentation procedure. For example, it is possible to set up conditions that guarantee two and only two sets. However, these sets may not correspond to human assessment of the proper membership of pixels in the sets.

Alternatively, it is possible to try to group pixels as closely as possible in accord with human perception. However, in such a case the required number of sets may not be obtained. In general, segmentation is a difficult problem for which a unique yet satisfactory solution is hard to find. In particular it is especially difficult to devise reliable segmentation schemes for subjects of widely varying shape and color such as occur, for instance, in animal red-eye. I has now been found that reliable segmentation of eyes, including eyes with the red-eye defect in both humans and animals, may be achieved by proper selection of the color information used in segmentation. In particular, it has been discovered that a ratio of two appropriately chosen color channels forms a basis for effective and reliable segmentation.

The color channels forming the ratio may be chosen from a broad range of color channels, though normally the color channels will be selected from the same color space. However, a large choice of color spaces is envisaged. An exemplary but not limiting list of color spaces includes RGB, CMY, CMYK, YIQ, YCC, YCbCr, YES, YUV, HVC, HIS, HSL, CIE L*a*b* or CIE L*u*v*. It is also envisaged that new color spaces may be derived from existing ones by means of principal component analysis (also called the Karhunen-Lowe transform). The actual channels taken to form the ratio used to conduct segmentation may, for instance, be selected beforehand by means of statistical analysis of a sufficient number of exemplary images as specific selected channels from a specific selected color space. Alternatively, the color space may be preselected and the channels used in the ratio may be determined dynamically and automatically by rule or principle or from the properties of the image. It is also contemplated that not only the pair of channels but also the color space from which they originate may be selected dynamically, for example based on the properties of the image of current interest. The method for choosing the pair of colors depends to a large extent on the task in hand and the nature of the images. For example, when it is known in advance that selection of eye pixels will always be from the category of human eyes with a red-eye defect, a ratio of certain specific fixed color channels can be preselected. A ratio of different fixed color channels, even from a different color space, may however be preselected for the category of "gold-eye" in humans. In the case of animal red-eye defects, where the color varies very widely, it is desirable and advantageous to select the color channels of the ratio dynamically from the information in the image. For eyes of generally invariant appearance it is generally preferred to preselect the channels; for eyes that vary greatly it is generally preferred to select the channels dynamically. The optimal channels in either case may be selected on the basis of experience or statistical measurements. However, it has been found that the ratio of the darkest to the brightest channel, or the inverse ratio, is frequently effective and to be preferred. In this case the brightest channel is defined as the one having the greatest sum of all pixel values within a given region of interest in the image and the darkest channel as that having the lowest sum of pixel values for all pixels in the same region. Though this is a preferred method of establishing the channel ratio it will be understood that wide variation of the basis for selecting the channels is possible and, indeed, contemplated.

It will be appreciated by those skilled in the art that the ratio of two channels, each with a fixed range of values, will have a larger range than either channel individually. This larger range may be used directly, for example by means of a floating point representation. Alternatively the range may be resealed to the original (e.g. integer) range of the channels making up the ratio. Another alternative is to limit the range of the channel ratio to no more than the original range of the channels making up the ratio by setting all values of the ratio that exceed a channel maximum to that maximum. This last alternative is particularly preferred.

Once a channel ratio is available, whether by preselection or by dynamic selection based on image data, segmentation may be carried out. Segmentation classifies the pixels in an image region of interest into eye pixels and non-eye pixels, or into red-eye defect pixels and non-defect pixels. It may be effected by any means known in the art. Non-limiting examples include clustering, such nearest neighbor or k-means clustering, or statistical analysis, such as linear discriminant analysis. A selection of other suitable classification methods may be found in T.-S. Lim, W.-Y. Loh and Y.-S. Shih, *Machine Learning Journal*, 40, 203 (2000), and include categories such as decision tree approaches, rule-based classifiers, belief networks, neural networks, fuzzy & neuro-fuzzy systems, genetic algorithms, statistical classifiers, artificial intelligence systems and nearest neighbor methods. These techniques may employ methodologies such as principal component analysis, support vector machines, discriminant analysis, clustering, vector quantization, self-organizing networks and the like. The various classification methods may be used either individually or in combination with each other. One effective method is based on segmentation of the integral histogram of the channel ratio. The histogram of a property of image pixels is a probability distribution of the property according to increasing size of the property. For each value of the property the number of pixels possessing that property is calculated to form this distribution. The resulting distribution may be normalized such that the total sum of pixels is scaled to unity. If the values of such a distribution are summed and, at each value of the property, the scaled number of pixels is replaced by the scaled sum of all pixels with a lower or equal value to the current one, the result is an integral histogram. The integral histogram is a monotonic non-decreasing function with a maximum range from zero to unity. The value of the histogram function at any point represents the fraction of pixels in the image region of interest that have a property value less than or equal to the value of the property at that point. Such an integral histogram may be used for segmentation, for example by thresholding according to a property so that two sets of pixels are formed, one set with values of the property below the threshold and a second with value of the property at or above the threshold. Alternatively, the histogram may be thresholded according to the value of the histogram function so that two sets of pixels are formed, one representing a certain fraction of pixels in the image region of interest and the other representing the remaining fraction, the two fractions summing to unity. The second thresholding method is preferred. When the ratio of the brightest to the darkest channel is used for segmentation the eye or eye-defect region is the set of pixels below the threshold. Segmentation may be carried out either once or iteratively by successive refinement of the pixel classes or sets through recalculation of the histogram of, for example, one set and renewed application of the same or different threshold. Iterative segmentation may be conducted for a fixed number of iterations or, alternatively, for an arbitrary number of iterations until some termination condition is met (e.g. that the change in the size of the segmented area is less than some threshold). The former method is preferred. A suitable number of iterations is from about 1 to about 20, with a preferred range of from about 1 to about 10, and an especially preferred range of about 3 to about 4. When iterative segmentation is used, it is preferred to use a smaller search region than the original one, which is centered on the set of eye pixels from the previous segmentation step.

Once the eye or defect pixels have been defined by segmentation they may be marked by any convenient means known in the art. For example, they may be represented as a list or a mask or by means of flags or by line segment encoding or by run length encoding or by a chain code or by other means. The defect may also be represented by a mathematical function fitted to the location of some or all of the pixels marked as part of the defect. It is particularly preferred to use a mask.

The segmentation based on a ratio of color channels gives rise to set of eye pixels requiring modification. As noted earlier, a set of eye pixels may also be prepared by selecting manually at least all the eye pixels requiring modification. Either one of these sets may be refined to exclude certain unneeded pixels by a process of refinement of the definition of eye pixels. This procedure will now be described in more detail. The refinement is based on segmentation as described for automatic classification of red-eye defect and non-defect pixels. All considerations described with respect to this segmentation apply equally to refinement. The primary distinction is that refinement utilizes a different preferred choice of channels for segmentation. In particular the choice of channels is dynamic and, though segmentation may be based on a ratio of color channels, this is not required. The exact choice of channel or channel ratios ratio is not critical to the invention, since the inventive concept is based on the method of automatically selecting one from a plurality of pixel properties. While the segmentation for classification of red-eye defect and non-defect pixels is preferably automatic, it is preferred that for segmentation conducted during refinement an operator control is provided, for example to control the desired degree of refinement.

The choice of channels is generally made as follows. A series of color channels or color channel ratios is prepared for the pixels of interest in the region of the eye. These may be any properties of the pixels but it is preferred to select channels or channel ratios that represent different aspects of the color distribution in the image region of interest, especially distinct aspects of the distribution. For example, the amount of a first color relative to a second color may be expressed as a difference or a ratio in a first property, while the amount of a third color relative to the second color may be expressed as a difference or ratio in a second property. A third property might be selected as a channel having a high variance or range in the region of interest, while a fourth property may be a channel having a low variance or range in the region of interest. Additional properties may, for example, represent brightness, or saturation or hue in the region of interest. Yet other properties may be based on principal component analysis of color distributions in the region of interest. A separate histogram is formed for each of the pixel properties under consideration and a statistical measure of central tendency of the histogram is computed. Examples of such measures include the mean, the mode and the median. The fraction of pixels within the region of interest with a property value not greater than the said measure of central tendency is computed. The property with the largest such fraction is selected as the property that is used for segmentation by the methods previously described. The rationale behind this approach is that, if the original estimate of the of the eye region is a good one (i.e. with few spurious or unwanted pixels), then that property which accounts for the largest fraction of pixels most descriptive of the true eye area.

Whether automatically or manually determined, and whether subsequently refined or not, a set of pixels is prepared that requires modification. One method of modification discussed previously was a template procedure that will now be described in more detail. A template in the context of this invention has two main aspects: a spatial component and a prescriptive component. The spatial component assists in determining the locations of various portions of an eye, for example the pupil, the iris, the sclera or the glint. The prescriptive component determines methods of correction for the different portions of the eye. Some portions of the eye structure may be represented either by the spatial or by the prescriptive components. For example, a glint could be specified as small region located in a specific position in the pupil (e.g. the center) or, alternatively, a glint could be specified as a procedure for forming a glint or modifying an existing glint.

It is preferred that the spatial component be first of all adaptive to the size of the eye in order that it be useful for eyes of different size, for example measured by the number of pixels contained within the eye. Second, it is preferred that the template be capable of describing the spatial location of at least the major structural components of the eye, in particular at least the location of the pupil and iris. However, it is also contemplated that the spatial component may contain other elements. For example, it may describe a location of a glint, or describe blend transitions between the glint and the pupil, between the pupil and the iris, or between the iris and the sclera. Even though the sclera does not normally require correction or modification, a portion of the sclera may be included in the template since this could contain information that assists in improving the quality of the modification. The spatial regions dedicated to the different portions of the eye may be in predetermined relationship to each other or may be modified dynamically depending on the actual image data upon which the template is superimposed. Additionally, it is contemplated that means may be provided to modify the spatial component of the template under the control of an operator, for example to cater for differences in personal taste or to allow the invention to be used for modification of objects other than eyes. As non-limiting examples may be cited modifications of the eye position or shape, of the transitions between structural elements of the eye, of the size of the iris, of the position of the glint and the like.

The prescriptive component may specify the method of correction in a number of ways. For example, it may simply specify a color to be applied to a particular portion of the eye by "painting over" or replacing the colors of the eye with some uniform color. Usually such an approach does not give optimal correction, though it may be useful for simulating the colorful and exotic contact lenses that are popular in some quarters. Alternatively, as is preferred, the prescriptive component describes a process for modifying a color, for example by replacement in one region and partial replacement in another region. It is particularly preferred that at least one element of the prescriptive component be adaptive to existing image data. For example, though it is customary to refer to eyes as "blue" or "green" or "gray", the color of the iris is not uniform. Close inspection reveals considerable color variation in the form of a distinct texture. Such a texture is primarily, though not exclusively, the result of variations in brightness. Without the presence of such texture the modified eye does not look realistic. Thus, when the color of the iris is being modified it is desirable to retain at least some of the original brightness variation despite changes in the hue or saturation or both of the iris. An eye severely degraded by the red-eye defect may be everywhere so bright and red that none of the original iris texture is retained. It is desirable to detect such a situation and, for example, simulate the missing iris texture through the addition of noise to the brightness component of the new, replacement color. This is what is meant by an adaptive procedure, namely one in which the method of correction of a region of the eye is modified or adapted to the actual conditions existing in the specific eye undergoing correction instead of always occurring in the same way for all eyes that are modified. Such adaptive procedures yield visually superior modifications and corrections compared to those from non-adaptive procedures. Another variant of adaptive correction concerns different methods of correcting the eye depending on its size. For example, a glint in the eye is simultaneously very bright yet has edges that blend into its surroundings. When a glint consisting of many pixels must be created, this glint structure presents no problems and blending can be achieved with straightforward and conventional modification (e.g. by blurring or feathering). However, when the eye is very small and the glint contains, for instance, 2 or 4 or 7 pixels this structure is much more difficult to reproduce. In such a case, and the more so if it is desired to let the operator modify the size of the glint, it is preferred to prepare a special procedure for creating realistic small glints that is distinct from that used for larger glints. In addition to specifying procedures for correcting individual portions of the eye it is advantageous for the prescriptive component to specify how these corrections combine. For example, the transition between the pupil and the iris is gradual rather than abrupt and a correction applied to the eye must reproduce this fact to appear realistic. This may be achieved by specifying methods of smoothing, blurring, blending or feathering between different regions of the eye. These transition procedures need not be the same for all transitions. For example, depending on the quality of the original image, large degrees of feathering or blurring of the outer circumference of the iris may be required to achieve a natural look. However, the same degree of feathering or blurring applied to the inner circumference of the iris would create an unnatural effect and destroy most of the interior structure of the eye. In addition to specifying distinct corrections for different portions of the eye and the nature of transitions between them the prescriptive component may also contain procedures for modifying the entire correction area. For example, when images from photos of high magnification are worked with, film grain contributes considerable noise to the image. In such conditions the modified region of the eye may be of excellent quality yet look unnatural because it is free of the graininess of the rest of the photograph. In such a situation special procedures applied to the entire eye region can improve the appropriateness of the correction for the image, for example by blurring the entire eye or adding noise to simulate grain. Additionally, it is contemplated that the prescriptive component of the template may allow for modifications under the control of an operator. For example, the operator may choose from a list of statistically derived iris colors or may create his or her own iris colors, which may nonetheless be applied in adaptive fashion. As other non-limiting examples, the operator may adjust the preferred level of feathering of the correction, or a preferred darkness of the pupil, or a preferred glint size or position.

With the aforementioned detailed description in mind, the invention may be seen in the following various ways:

A specific method according to the more generic approach of the invention for correcting red-eye defects may comprise:
establishing a region of interest of the image in which a red-eye defect exists;
automatically determining the red-eye defect area;
correcting the defect area;
wherein the automatic determination of the red-eye defect area is achieved by segmentation based on a property that is the ratio of two color channels in the image region of interest.

Alternatively, the invention may be viewed in these terms:

A method according to the invention for correcting red-eye defects comprises:
determining an initial definition of the red-eye defect area;
improving the quality of definition of the red-eye defect area;
correcting the defect area;
wherein the improvement of the quality of the definition is achieved by segmentation based on one of a plurality of pixel properties selected such that largest number of pixels in the unimproved defect area have property values less than or equal to a measure of the central tendency of the distribution of the property when similarly compared to the remaining properties.

Yet another perspective on the invention is:

A method according to the invention for correcting red-eye defects comprises:
determining the red-eye defect area;
correcting the defect area;
wherein the correction is based on a template specifying structural portions of the eye and methods for their correction, where at least one such method of correction is responsive to specific conditions within the red-eye defect area that vary from eye to eye.

Another generic perspective on the practice of the present invention includes a method for modifying color within a region of an image comprising:
selecting an image to have modification of color applied thereto;
defining a first area within the image that has image data of a first region where color is to be modified;
providing data from within the first area within the image comprising color channel data for at least two colors;
comparing the color channel data within said first area for the at least two colors;
altering at least some image data within said first area to modify the color within the first region of the image. A preferred method is where the first region of the image is selected as representing an eye. An eye, as a term generally used in the practice of the present invention comprises the regions generally considered as the pupil and the iris. The region may contain other attributes within the image (such as regions of glint), or may be partially eclipsed by eyelids, hair strands, intervening objects (e.g., fingers, lashes, non-animal objects, etc.), but the term is primarily concerned with the pupil and surrounding iris. In treating or addressing images of humans, the pupil and iris distinction, and the distinction between the iris and pupil and the surrounding lighter (whiter) area, the sclera, tends to be much more important than with certain other animals where the sclera is minimally visible. The first region is preferably selected as representing an eye comprising a pupil and an iris. The image data in the first region preferably is regarded, stored or evaluated as a second region representing an iris within the first region separate from a third region representing a pupil from within the first region. In modifying the color of the first region, different colors may be provided for the second region and the first region when color is modified in the first region. The data from the image in the second region is preferably provided at least in terms of brightness distribution within the second region. The data from the original image, even when the data is highly defective from the red-eye effect, often retains data of brightness distribution (texture) within the region of the iris, which is the natural state of data for an iris. The retention of this brightness or lightness distribution (e.g., the L value in many three dimensional color spaces, such as L*u*v* or L*a*b* systems, LHC systems and the like, or the Y value in others, such as YIQ, YUV, YCC or YCbCr) is a valuable aspect of the invention. Particularly in relatively close-up or blown-up images where the eyes are a prominent feature, the perception and display of texture (lightness or brightness variations) in the iris is very important and adds significant quality to the image and the image correction process. No other eye color-correction system is known to address this feature.

This method may be effected by modification of color within the first region comprising altering at least the hue in the second region without altering the brightness distribution in the second region. The saturation of the color within the second region may be altered automatically, by automatic selection or default by programs, or by operator selection by continuous saturation control or by selection from among specifically provided saturation choices. Any of these processes may be embedded in a computer with variations of hardware, software or internet connections to programs and content that can execute the various processes.

One aspect of the present invention is to practice the method wherein lightness distribution within the outer portion of the virtual geometric shape that represents the iris is determined, and the correction of image data in the outer portion alters at least one property selected from hue and saturation without substantially changing the relative spatial distribution of lightness variation-determined to have been in the outer portion of the virtual geometric shape that represents the iris. The term "substantially changing" is more than a subjective effect, but may be statistically analyzed. At a minimum, substantial change would mean than no particular lightness component should be changed by more than an absolute 1% at any particular lightness value, no more than an absolute 2%, 3%, 5%, 6%, 10% or 15%. Changes beyond 15% would clearly change the underlying lightness data. It is, as noted earlier, within the practice of the present invention to provide an artificial template of lightness distribution from an image of an iris.

These and other non-limiting aspects of the invention are further illustrated with examples. It is to be noted that even though the following examples may refer to specific steps, different conditions, specific algorithms or equations, and specific mathematical treatments, these are merely representative and exemplary specific embodiments and are not intended to limit the scope of practice of the invention. One skilled in the art can readily provide alternatives based upon the disclosure of the invention provided herein.

EXAMPLES

To clarify the description of the invention it is helpful to define some terminology. Segmentation refers to dividing the image or a portion of the image into one or more regions of contiguous pixels. Usually it is an objective for these regions to correspond to structural units in the scene or to distinguish physical objects in the image that are of interest. The challenge in segmentation is to divide the image into regions that accord with human perception and knowledge of the physical world. The regions resulting from segmentation may be defined by a number of means, for instance with a mask, a chain code, or as a list of pixels. However, the term segmentation does not imply any particular form of data representation. A histogram of an image property is a frequency distribution of that property. In other words, it is a function showing, for each successive value of the property, the number of pixels in the image that have that property. The abscissa is the property and the ordinate is the frequency of occurrence. An example of an image property from which a histogram can be formed is the color channel of an image as represented by its intensity values. A sparse histogram is one in which some there are gaps because there are no pixels in the image with certain values of the image property. When the frequency of occurrence is divided by the number of pixels in the image, the histogram is said to be normalized and the sum of the individual occurrence frequencies is unity. An integral or cumulative histogram is formed by summing, for any given value of an image property, the frequencies of occurrence of all lower values of this property up to and including the given value. When the histogram is normalized, the ordinate lies in the interval 0 to 1 inclusive.

Two modes of defining the red-eye defect area are envisaged: manual and automatic definition. The manual mode may take two forms. In a first, simplified manual mode the operator drags out a circular defect area indicator on the image with a pointing device such as a mouse, pen or trackball. Once placed, the boundaries of this defect area indicator may be deformed to change the shape from circular to elliptical and the resulting ellipse may be rotated. This permits a defect area to be defined for animal eyes, in which the pupil need not be circular. In the second manual mode the operator outlines a defect area of arbitrary shape using conventional selection tools used in image editing, such as a freehand selection tool or a point to point selection tool. Such tools may be found for instance, in the Paint Shop Pro 7 image editing software available from Jasc Software, Inc., 7905 Fuller Road, Eden Prairie, Minn. 55344. In the automatic method, the operator marks a point anywhere in the defect area using a pointing device and the boundaries of the defect area are then computed automatically. The method for automatically defining the defect area is described below.

Automatic Determination of Red-eye Defect Area

The operator input specifies a point I(i,j) in the image, where i is the horizontal pixel coordinate and j is the vertical pixel coordinate. This starts the automatic determination of the correction area.

Step 1.1—Definition of a Search Area

A square search window is centered on the point I(i,j), with corner coordinates (i−w,j−w), (i−w,j+w), (i+w,j+w), (i+w,j−w). The quantity w may be chosen as any convenient value, representing a compromise between the likely maximum size of the eye defect and a small size to reduce processing time. Empirically, an initial value of 50 pixels has been found adequate. Otherwise, a value from prior processing is used, as computed in Step 1.6.

Step 1.2—Channel Selection

A smaller sub-window is defined within the search window, having the corner coordinates (i−fw,j−fw), (i−fw,j+fw), (i+fw,j+fw), (i+fw,j−fw). The factor f may be chosen as any convenient value, representing a balance between the likely eye defect region within the sub-window and the region surrounding the defect outside the sub-window. Empirically, a value of 0.33 has been found adequate. Within the sub-window the values of the R, G and B (red, green, blue) channels of the image are summed independently. The channel with the largest sum is defined as the brightest channel $C_B$ and the channel with the smallest sum is defined as the darkest channel $C_D$. If it is known in advance that the red-eye defect is a human eye defect, $C_B$ may be chosen as the red channel and $C_D$ as the green channel.

Step 1.3—Preprocessing

The objective of preprocessing is to eliminate the effect of image noise on subsequent steps and to emphasize brightness variation in the search channels $C_B$ and $C_D$. The exact preprocessing steps are not critical to the invention and any method known in the art may be used to achieve the intended objectives. However, the following procedure has been found effective. Preprocessed $C_B$ and $C_D$ channels are formed independently within the search window by applying twice a median filter with a window of 5 by 5 pixels for human eyes or 9 by 9 pixels for animal eyes, followed by application of a rank order filter with a window of 3 by 3 pixels. The rank order filter sorts the pixel values in its window from minimum to maximum, computes the average and median in the window, and sets the output central window pixel to the minimum if the average is less than or equal to the median, and to the maximum otherwise.

Step 1.4—Forming the Search Channel

The search for the eye defect area is conducted in a single channel, S, formed from preprocessed $C_B$ and $C_D$ values according to:

$$S = \min\{255, 255[C_D/\max(C_B,1)]\}$$

where the minimum and maximum are computed in the search window. S is simply the ratio of darkest to brightest channels scaled to the range of an 8-bit integer. Clearly, other integer or floating point representations of this ratio may be used. Segmentation of the defect area is conducted using this channel in as described in the following two steps. The advantage of this representation is that it adapts to image content and makes no assumptions about the dominant color of the red-eye defect.

Step 1.5—Histogram Thresholding

An integral histogram of S values is formed and normalized to the range 0 to 1 by dividing by $4w^2$. Then, for an integral threshold T, the corresponding value of S, $S_T$, is determined. The value of T is chosen depending on the type and severity of red-eye defect that is likely to be encountered. Empirically, a value of 0.8 has been found effective for a very wide variety of cases. The values of the S channel are now updated according to the following rules. If S is greater than $S_T$ the new value of S is 255, otherwise the new value is $S \times 254/S_T$. The calculation of values has been illustrated for an 8-bit integer representation of the S channel, but other representations are possible. At this stage the candidate red-eye defect area has S values less than 255, while the candidate surrounding area has S values of 255. The candidate defect region may contain holes in the form of S values of 255 surrounded by smaller values of S. Such a situation may be caused, for instance, by the presence of a glint caused by specular reflection from the eye. These holes are filled using the conventional morphological operations of dilation followed by erosion.

Step 1.6—Circularity Constraint

The red-eye defect is not required to be circular. However, the defect is usually to be found contained within a circular area and it is helpful to use this fact as an additional constraint in segmentation. Accordingly, using the updated S channels and the point I(i,j) as a center, eight radius vectors are extended in the north, north east, east, south east, south, south west, west and north west compass directions, each vector terminating at the first pixel with an S value of 255. The longest of the eight vectors is taken as the radius, r, of the circumscribed circle containing the red-eye defect. The position of the center point I(i,j) is updated as follows. The new coordinates (i,j) are calculated as the arithmetic mean of the outer ends of the radius vectors and the radius, r, is taken as the mean of the lengths of the radius vectors. The quantity w used to define the search window is now set equal to twice the radius. In rare cases a radial vector with non-zero length cannot be found. In such a failure case, the segmentation procedure branches to an alternative step described below (Step 1.9).

Step 1.7—Second Segmentation

The initial estimate of the candidate area of the red-eye defect is improved by a second segmentation stage. This is done by repeating steps 1.1 through 1.6.

Step 1.8—Third Segmentation

The improved estimate of the candidate area of the red-eye defect is further improved by a third segmentation stage. Empirically it has been determined that no benefit is obtained by more than three segmentations. The third segmentation is done by repeating steps 1.1 through 1.6, but two additional conditions are applied at step 1.6, as follows. First, if any of the eight radius vectors have zero length, the segmentation is considered to have failed. Second, the mean of the three shortest radius vectors, $r_{mean}$, is computed and compared to the longest radius vector, $r_{max}$. If $(r_{max}-r_{mean})$ exceeds $0.25r_{max}$, the segmentation is considered to have failed. If the conditions are satisfied, then the red-eye defect area has been automatically defined. The defect area is represented as a rectangular mask in which a specific value marks the surroundings of the defect that are not to be corrected and all other values represent the defect area. In the case of an 8-bit integer representation the surroundings may be assigned a value of 255. If the conditions of step 1.6 are not satisfied, processing passes to step 1.9.

Step 1.9—Alternative Processing

This step is only executed in the event of a failure at step 1.6. Such a situation can arise in the case of images in which there is some corruption of the head region additional to the red-eye effect, for example because of poor image sharpness, low image contrast, overexposure, underexposure or color casts. Step 1.9 consists of repeating steps 1.1 through 1.8 using only the darkest channel $C_D$. Alternatively, the green channel can be taken for human eyes instead of the darkest channel. Thus, the following processing changes are made: in step 1.3 only the $C_D$ channel is processed; in step 1.4 the S channel is simply replaced by $C_D$; in step 1.6 the threshold T is set to 0.5 rather than 0.8; in step 1.6 the position of I(i,j) is not updated, the radius is taken as the length of the longest vector, and w is taken to be equal to the radius. After successful execution of step 1.9 the definition of the red-eye defect area is complete. The defect area is represented as a rectangular mask in which a specific value marks the surroundings of the defect that are not to be corrected and all other values represent the defect area. In the case of an 8-bit integer representation the surroundings may be assigned a value of 255. In the extremely unlikely even that step 1.9 fails, the operator is notified. Typically it is then sufficient simply to mark an alternative initial point I(i,j) to receive a satisfactory segmentation of the red-eye defect.

No matter how the red-eye defect area was defined, whether by automatic or manual means, it is represented by the aforementioned mask. Optionally, a means may be provided to move or resize this mask to better accommodate the operator's judgement of the red-eye defect area. Some refinement of the definition of the defect area may, however, be necessary. This can occur, for instance, when the defect area is irregular in shape or is partly obscured by eyelids, lashes, hair or fur. In order to allow easy improvement of the shape and extent of the red-eye defect area a method of refinement is provided. This method is characterized by automated choice of an optimal image information channel for refining the defect area.

Refinement with Automatic Choice of Algorithms

The mask defining the red-eye defect is, in general, a rectangle of width a and height b centered on a point I(i,j). The mask is assumed to include the entire red-eye defect within it. This condition can always be assured, if necessary by manual intervention during the definition of the defect. Some pixels within this area are marked as corresponding to the defect and others as corresponding to its surroundings. Refinement comprises shrinking the red-eye defect are in such a way as to eliminate regions improperly marked as defect without loss of correctly marked defect regions. This is accomplished as described below.

Step 2.1—Definition of Sub-window

The purpose of this step is to define a sub-window in the mask rectangle that is most representative of the red-eye defect area. Since the center of the mask is most likely to include the defect, a centered sub-window is preferred. This sub-window may be defined similarly to that step 1.1 of the automatic definition of the red-eye defect area. Thus the sub-window may be a rectangle of width 0.33a and height 0.33b centered on I(i,j). However, it has been found that an alternative shape of the sub-window is advantageous, especially when there is the possibility of a non-circular pupil such as that of a cat. This alternative shape is a rectangle of width 0.2a and height b centered on I(i,j). Considerable variation in the definition of the sub-window is possible provided it represents predominantly a central area of the mask. It is preferred that the size of the sub-window is about 10% to about 30% of the mask area.

Step 2.2—Definition of Channels

A variety of different channels, C, may be constructed for use in refining the red-eye defect area by means of segmentation. Such channels are constructed from the original color data of the image in such a way that the defect area tends to have lower channel values than do the surroundings of the defect. The exact choice is not critical to the invention, since the inventive concept lies in the method of choice of an optimal channel from those that are available. However, the following channels have been found useful:

(a) The ratio of the darkest channel to the lightest channel, i.e. $C_D/C_B$.
(b) The reciprocal of the lightest channel, i.e. $1/C_B$.
(c) The green channel, G.
(d) The Y channel of the YIQ color space.

The darkest channel, $C_D$, is obtained as the channel with the lowest mean value within the sub-window defined in step 2.1 and the brightest channel, $C_B$, is obtained as the channel with the to highest mean value within the sub-window. Choice (b) is useful when the red-eye defect area is lighter than its surroundings. Choice (d)—the Y channel—is particularly useful in the case of human eyes, where the white of the eye and the skin surrounding the eye is generally lighter than the red-eye defect. The chosen channel may be median filtered prior to other processing, for example, with a window 7 by 7 pixels for (a), 9 by 9 pixels for (b), and 5 by 5 pixels for (c) or (d).

Step 2.3—Estimation of Figure of Merit

As a first stage, each of the channels, C, derived in step 2.2 is median filtered with a 5 by 5 pixel window to reduce the effect of any glint. Then, for each of the channels, C, a histogram is constructed using data for every pixel that is marked in the mask as corresponding to the red-eye defect. A threshold, T, is determined as the median value of the channel data. Since the histogram may be sparse, especially when the mask is small, in practice the value of T is chosen to be that channel value in the histogram which lies closest to the median. The histogram is then stretched by setting C values greater than T to 255 and, for the remaining C values, computing modified C values according to C×254/T. The calculation of values has been illustrated for an 8-bit integer representation of the C channel, but other representations are possible. Finally, the average value of each modified channel C is computed in the sub-window excluding the highest value and the average is used as a figure of merit.

Step 2.4—Refinement

The figure of merit in defined in step 2.3 is used to select one of the channels, C, constructed in step 2.2. The channel chosen is that with the smallest average in the sub-window. Recalling that the red-eye defect area is represented by low channel values, use of a lowest figure of merit identifies that channel which best represents the defect area with low values. This is equivalent to the assumption that the initial estimate of the defect area was a good one. For the selected channel, the operator is provided with a control to modify the threshold, T, which is initially set to the median value used in step 2.3. By reducing the threshold, regions of the candidate red-eye defect area are progressively removed resulting in a refined defect area. To assist the operator in the task of refinement, the extent of the defect region for any value of the threshold, T, should be displayed in the image. Any convenient method may be used for this purpose, such as the conventional "marching ants" border used to mark selection boundaries in image editing software. A contrasting mask overlay, including a semi-transparent overlay, may also be used. However, the most effective procedure is to display a correction of the red-eye defect whose extent changes with modification of the definition of the defect area in response to the value of the threshold, T. The procedure for forming the correction is described below.

It will readily be appreciated that the channels selected in step 2.2 may be defined in such a way that they tend to have high values in the red-eye defect area and low values in the surroundings of the defect. In such a case, the figure of merit in step 2.4 is chosen to be the largest one. Either possibility is envisaged in the scope of the invention. Further, following refinement it may be desirable to fill any interior holes in the refined defect area using a dilation and erosion procedure as for step 1.5. This is the preferred procedure when it is know that the defect is in a human eye, since usually human eyes lead to near circular defects without internal holes. It is also envisaged that the refinement steps 2.1 to 2.4, using an optimized fixed threshold, can be appended to step 1.8 or step 1.9 of the automatic determination of the red-eye defect area.

Once the region of the red-eye defect has been defined, by whatever means are chosen, it is possible to form a correction of the red-eye defect. In the case of a human eye, the correction involves restoration of the pupil and also, at least potentially, restoration of the iris, restoration of the glint, and blending of the correction into the surrounding image. In the case of animals, where the pupil is normally large, the pupil is corrected and, optionally, the glint is restored and the correction is blended with the surroundings. Prior art methods typically achieve correction by some form of desaturation of the red-eye defect area, effectively converting it to a gray region, using some provision for blending into surroundings. This can be effective when the detail of the eye is not destroyed by the red-eye effect so that only removal of the red is required. It is, however, an object of this invention to provide the ability to completely reconstruct the features of the eye in the event they have been totally destroyed by severe red-eye. As the more complex case, correction of human red-eye is described first. While the correction of red-eye is described for convenience as a series of steps, no specific order of steps is implied. The steps may, in fact, be conducted in any convenient sequence.

Correction of Human Red-eye

Step 3.1—Definition of the Pupil and Iris

A red-eye defect area is defined as a square mask (or square area, square region), some pixels of which are marked or designated, defined, identified or determined as belonging to or suffering from the red-eye defect. A virtual circle (or other geometric shape, such as an oval, rounded corner rectangle, rounded corner polygon, etc.) whose diameter approximates or is the width or corner-to-corner dimension of the square mask is inscribed in or around a square the size of the mask. The central portion of the virtual circle is assumed or defined to represent the pupil and the outer portion of the virtual circle is assumed or defined to represent the iris. Empirically, it has been found that setting the width of the iris annulus to between 0.2 to 0.6, such as between 0.3 and 0.5, between 0.35 and 0.45, and especially approximately 0.4 of the circle radius leads to a natural-looking correction. If the iris width so calculated is less than one pixel, the iris is assumed to be absent. The stated choice for the iris size gives good results in a range of situations, for instance when the red-eye effect includes the part of the iris or the whole iris. Even when the red-eye effect is restricted solely to the pupil, use of an iris annulus provides a natural transition between the corrected pupil and the unaffected iris. Optionally, a manual control can be provided to set any desired iris width, for example from 0 to 0.9 of the radius of the inscribed circle, 0.1 to 0.9, 0.1 to 0.8, 0.2 to 0.8, 0.2 to 0.7, etc.

Step 3.2—Correction of the Pupil

Pixels in the virtual circle defined as belonging to the pupil in step 3.1 are replaced by a color that can be overwritten or easily replaced, preferably a neutral color, such as a neutral gray. This lightness of this neutral color (described hereinafter for brevity as gray) may be based both on the lightness of the pupil in the presence of red-eye and also, or alternatively, on the lightness of the area surrounding the red-eye defect. However, empirically, it has been found sufficient to set the overall pupil color to a default gray corresponding to a preselected neutral color value (e.g., such as a low R,G,B color content neutral color), such as for example, red, green and blue values of 50 (e.g., from 10 to 100) in an 8-bit channel representation, i.e. to a 20% gray (e.g., to a 5 to 40% gray). Additionally, for the outermost four pixels of the pupil disk, the gray value may change radially from 50 (20% gray) at the inside to 60 (24% gray) at the outside in a linear fashion, that is from a lower optical density at the outside of the circle to a higher density at the inside of the circle. It is also possible, with some modest disadvantage over the other density ordering, to have a higher density at the outside of the circle and a lower density at the inside of the circle, or even an also less preferred constant optical density. A benefit of the higher central density is that such a distribution corresponds more closely to the higher optical density pupil and lower density iris. Optionally, a manual control can be provided to adjust the pupil brightness, for example by providing a multiplier ranging from 0 to 3.0 for the default gray color.

Step 3.3—Correction of the Iris

If step 3.1 results in a non-zero iris size, correction of the iris is carried out. This correction is effected with the aid of a palette of iris colors determined by statistical examination of a broad range of eye images to be representative of the full range of naturally occurring eye colors. Categories of iris colors may include aqua, blue, brown, gray, green and violet, as well as mixtures of colors as described above. Each category contains at least several shades of identical hue and saturation but of differing lightness level. In some categories, especially brown, blue and green, it is preferable to provide additionally more than one distinct hue and more than one saturation level of each hue. Hue, lightness and saturation may be represented in any convenient color space such as HLS or CIE L*a*b*. However, a representation in the YIQ color space is both simple and adequate. Gray is selected as the default iris color since it looks natural in the largest number of cases, but the operator may choose any iris color category. Advantageously, the colors in the iris palette are displayed as an eye having the relevant iris color to allow the operator to form a good impression of how a particular color is rendered in an actual iris. When the operator selects a particular color category, an appropriate brightness iris color is applied automatically. A non-limiting example of automatic application may be practiced according to the following procedure. The average value, $Y_{avg}$, of Y is calculated for the iris region and compared to the Y value of the palette colors, $Y_{palette}$, in the selected color category. That palette color is selected for which $Y_{palette}$ is most similar to $Y_{avg}$. Then, the Y value of every pixel in the iris, $Y_{iris}$, is replaced by a value of $Y_{iris}-Y_{avg}+Y_{palette}$. When the color category contains colors of different saturation, the least saturated color is chosen for determination of $Y_{palette}$. Additionally, each iris pixel acquires the I and Q values of the selected palette color and the resulting YIQ values of each iris pixel are converted to RGB for display. This method of iris color correction has an advantage over prior art "painting in" of a single iris color (as for instance in U.S. Pat. No. 6,204,858) because it maintains the normal texture of the iris and results in an especially natural look. This can be important when the eye is large or the photo is one of high resolution. Additionally, this procedure effectively disguises any small error(s) in the choice of iris size. As an alternative to this automatic assignment of iris brightness, it is also possible for the operator to select any available iris color from the entire palette of iris colors.

Step 3.4—Correcting the Glint

The glint is a bright specular reflection from the front of the eye, which contributes a lively look. Eyes without a glint are usually described as "dead," so a natural looking glint is very important to the provision of a high-quality successful red-eye correction. Conventional methods for correcting the glint typically involve darkening all but the lightest areas of the pupil. In contrast, the procedure of this invention permits the glint to be located anywhere in the eye, including the iris, as is a natural event, or to reconstruct a glint when one is absent entirely, or to create a realistic glint even in the presence of specular reflections from contact lenses or from multiple light sources. The position of the glint may be determined as follows, for example. The location of brightest pixel lying within the red-eye defect region is determined and used as the center of the glint. In the event of several pixels having the same brightness, that closest to the center of the circle defined in step 3.1 may be automatically taken as the position of the glint center. Optionally, the operator can also be provided with a control to exactly center the glint in the circle or select a specific position within the circle. Empirically, the optimal default glint size has been found to be of 12% of the pupil area (e.g., between 10 and 18%, between 10 and 17%, between 11 and 16%, between 11 and 15%), or one pixel, whichever is larger. A suitable maximum brightness, $Y_{center}$, for the center of the glint is from about 220 to 240 using an 8-bit integer representation, i.e., from about an 86% gray to a 94% gray. A particularly preferred value is about 234 (92% gray). Two methods of constructing the glint are used depending on its absolute size in pixels, one for small glints and one for large. The small glint procedure is particularly useful when the glint fits inside a 5 by 5 pixel square. In this case, the glint is grown as a spiral starting from the center pixel of the glint. The center pixel of the glint and any pixels that touch it are assigned brightness of $Y_{center}$. Pixels more distant from the center are assigned a lower brightness. This may be done, for example, by any gradation application, weighted averaging as a function of distance from the approximate center or diminishing factor, for example, according to the equation:

$$Y=Y_{center}/[D+E(1-D)]$$

where D is the distance of the pixel to the center pixel of the glint and E is given by:

$$E=(Y_{center}-Y_{min})^3/(255-Y_{min})^3$$

where Ymin is the minimum brightness in the corrected pupil region and an 8-bit representation of Y is assumed. For larger glints, the glint is created as a circle (or other geometric shape that could represent the shape of a light source) centered on the glint location with all the pixels set to a brightness of $Y_{center}$. In a final stage the glint is blended into the pupil by smoothing with a weighted average filter with a window of 3 by 3 pixels. The weights are chosen to minimize blurring when the glint is small and the brightness difference between glint and pupil is the least. The weights in the averaging window are progressively equalized until for smoothing of glints larger than 5 by 5 pixels all the weights are unity. Optionally, the operator may also be provided with a control to brighten the glint, for example by applying a gamma correction function to the glint pixels.

Step 3.5—Blending the Correction

The purpose of this step is to make the corrected region of the image seamlessly blend with the rest of the image. Three separate elements are involved. First, the pupil must blend smoothly into the iris if both are being corrected. Second, the edge of the correction area must blend smoothly into the surrounding image. The third situation concerns photographs that, for example, have been scanned at high magnification and are subject to noise and film grain. In such a case, the entire corrected area can appear excessively crisp and must be given an appearance more like the rest of the image. Any convenient method known in the art can be used to achieve blending of the correction. However, is has been found effective to handle the first and second elements similarly with a feathering procedure. This involves creating a new correction image by linear combination of the original correction and a smoothed correction masked to affect only the boundary between pupil and iris and between the edge of the correction region and the rest of the image. A default degree of feathering is preferably provided. Optionally, an operator control may also be provided to allow adjustment of the degree of feathering by combining increasing amounts of smoothed correction with the original, by smoothing the smoothed correction to a greater degree, and by increasing the widths of the image transitions being affected. In the case of the third element, it has been found effective to use a radial blur centered on the virtual circle defined in step 3.1, with the amount of blur decreasing radially outwards beyond the edge of the red-eye defect region. By default, no blur is performed. However an optional operator control can be provided to allow blurring, increasing amounts of blur being accomplished by extending the radius of the blur and combining a larger proportion of the blurred image with the original image.

The correction of animal eyes is considerably simpler since the iris is not modified. The procedure is very similar to that used for human eyes and is described below.

Correction of Animal Red-eye

Step 4.1—Correcting the Pupil

In contrast to human pupils, which are corrected to a neutral gray with a default brightness of a 20% gray, two distinct basic pupil colors are provided for animals. The first is an off-gray (e.g., as an example of a specific, non-limiting value, the gray may be) defined by the YIQ coordinates Y=34, I=3.556 and Q=–0.268. Any preselected value may be chosen as suitable for the majority of animal eyes and is used as the default color. The second pupil color is a brown shade typical of certain breeds of dogs. It is defined by the YIQ coordinates Y=32, I= 25.838 and Q=–1.129. Each of the pixels being corrected acquire the I and Q values of one of these pupil palette colors. The Y value is computed as $Y_{pupil} - Y_{avg} + Y_{palette}$, where $Y_{pupil}$ is the brightness of a pupil prior to correction, $Y_{avg}$ is the average brightness of the pupil before correction and $Y_{palette}$ is the Y value of the palette color. This procedure maintains a natural brightness variation within the pupil. Optionally, a manual control can be provided to adjust the pupil brightness, for example, by providing a multiplier ranging from 0 to 3.0 for the brightness of the automatically assigned color.

Step 4.2—Correcting the Glint

The glint is created by the method used for human eyes and described in Step 3.4

Step 4.3—Blending the Correction

Blending of the correction is accomplished by the method used for human eye described in Step 3.5. However, since no iris has to be created, there is no need to feather the junction between pupil and iris. This function is performed by feathering the edge of the correction area into the surrounding image.

In addition to correcting the red-eye effect in humans and animals the present invention lends itself to simple modification of the iris color in normal human eyes. For example, a circular correction area can be set manually by means of a pointing device to exactly circumscribe the outside of the iris. Then, the iris color can be modified and replaced with another by the procedure of step 3.3. Any overlap of the correction with surrounding skin areas may be eliminated using the refinement method described in steps 2.1 to 2.4. Compared to conventional procedures for recoloring eyes using retouching tools, very little effort is required to change iris colors by the method of this invention. This results from parameter choices based on examination of a large number of images containing eyes at a variety of sizes and the adaptive way in which eye colors are computed. The latter ensures that the brightness variation responsible for the original texture of the iris is maintained after the color change. In such a procedure for iris color change, modifications to the pupil region of the eye may optionally be eliminated.

What is claimed is:

1. A method of automatically identifying a red-eye defect in a region of an image comprising classifying pixels within the region according to a ratio of the respective values of a first color channel and a second color channel, a red-eye defect being identified when the value of the ratio exceeds a predetermined value; wherein the classifying of pixels is performed without specifying use of a particular color in the red-eye defect.

2. The method of claim 1 wherein a region of an image is first selected for analysis of a value of a color channel ratio to search for a red-eye defect.

3. The method of claim 1 wherein the ratio of values of color channels comprises a ratio of the darkest color channel to the lightest color channel.

4. The method of claim 1 wherein the ratio of values of color channels comprises a ratio of the lightest color channel to the darkest color channel.

5. The method of claim 1 wherein the classification is effected by a procedure selected from the group consisting of segmentation, iterative segmentation, and iterative segmentation based on a threshold value of color channel ratios.

6. The method of claim 1 wherein the classification is effected by a procedure selected from the group consisting of segmentation, iterative segmentation, and iterative segmentation based on a threshold value of area ratios.

7. A method of identifying a red-eye defect in a region of an image comprising classifying pixels within the region according to a ratio of the respective values of a first color channel and a second color channel, a red-eye defect being identified when the value of the ratio exceeds a predetermined value; wherein the classifying of pixels is performed without specifying use of a particular color in the red-eye defect.

8. The method of claim 7 wherein a region of an image is first selected for analysis of a value of a color channel ratio to search for a red-eye defect.

9. The method of claim 7 wherein the ratio of values of color channels comprises a ratio of the darkest color channel to the lightest color channel.

10. The method of claim 7 wherein the ratio of values of color channels comprises a ratio of the lightest color channel to the darkest color channel.

11. The method of claim 7 wherein the boundaries containing at least all pixels of a red-eye defect are identified by classifying pixels within the region according to values of a ratio of color channels, red-eye defects being identified when values of the ratio exceed a predetermined value.

12. The method of claim 7 wherein the boundaries containing at least all pixels of a red-eye defect are identified by classifying pixels within the region according to values of a ratio of color channels, red-eye defects being identified when values of the ratio do not exceed a predetermined value.

13. The method of claim 11 wherein pixels within the bounded region are classified into eye and non-eye pixels according to one of a plurality of pixel information channels, wherein the one channel is selected as the one of a plurality of channels that contains the largest number of pixels in said region that exceeds an area threshold at a predetermined measure of central tendency computed for each respective channel.

14. The method of claim 12 wherein pixels within the bounded region are classified into eye and non-eye pixels according to one of a plurality of pixel information channels, wherein the one channel is selected as the one of a plurality of channels that contains the largest number of pixels in said region that exceeds an area threshold at a predetermined measure of central tendency computed for each respective channel.

15. A method of automatically identifying an object within in a region of an image comprising classifying pixels within the region according to a ratio of the respective values of a first color channel and a second color channel, an object being identified when the value of the ratio exceeds a predetermined value;
wherein the classifying of pixels is performed without specifying use of a particular color in the object.

16. A method of selecting pixels from a digital image that has an eye defect, comprising circumscribing a region including all pixels of a portion of an image comprising an eye, and classifying pixels in this region into eye and non-eye pixels according to one of a plurality of pixel information channels, wherein the one channel is selected as the one of a plurality of channels that contains the largest number of pixels in said region that exceeds an area threshold at a predetermined measure of central tendency computed for each respective channel.

17. A method of selecting pixels from a digital image that has an eye defect, comprising circumscribing a region including all pixels of a portion of an image comprising an eye by classification of pixels to one of a plurality of pixel information channels, wherein the one channel is selected as the one of a plurality of channels that contains the largest number of pixels in said region that does not exceed an area threshold at a predetermined measure of central tendency computed for each respective channel.

18. A computer having a program therein that can effect a method for detecting identifying a red-eye defect, wherein the method comprises the method of claim 1.

19. A computer having a program therein that can effect a method for correcting red-eye defect, wherein the method comprises the method of claim 11.

20. A computer having a program therein that can effect a method for correcting red-eye defect, wherein the method comprises the method of claim 12.

21. A computer having a program therein that can effect a method for correcting red-eye defect, wherein the method comprises the method of claim 13.

22. A computer having a program therein that can effect a method for correcting red-eye defect wherein the method comprises the method of claim 14.

23. A computer readable medium having computer executable instructions for performing steps comprising:
classifying pixels within a region of an image according to a ratio of the respective values of a first color channel and a second color channel; wherein the classifying of pixels is performed without specifying use of a particular color channel in the region of the image; and,
identifying an object in the region of an image; the object being identified when the value of the ratio exceeds a predetermined value.

24. A computer readable medium according to claim 23 wherein the object is a red eye defect.

25. A computer readable medium according to claim 23 wherein the identifying is automatic.

26. A computer readable medium according to claim 23 further comprising:
providing for preliminarily selecting the region of the image for analysis of a value of a color channel ratio.

27. A computer readable medium according to claim 23 wherein the ratio of values of color channels comprises a ratio of the darkest color channel to the lightest color channel.

28. A computer readable medium according to claim 23 wherein the ratio of values of color channels comprises a ratio of the lightest color channel to the darkest color channel.

29. A computer readable medium according to claim 23 wherein the boundaries containing at least all pixels of a red-eye defect are identified by classifying pixels within the region according to values of a ratio of color channels, red-eye defects being identified when the value of the ratio is one of exceeding or not exceeding a predetermined value.

30. A computer readable medium according to claim 23 wherein pixels within the bounded region are classified into eye and non-eye pixels according to one of a plurality of pixel information channels, wherein the one channel is selected as the one of a plurality of channels that contains the largest number of pixels in said region that exceeds an area threshold at a predetermined measure of central tendency computed for each respective channel.

31. A computer readable medium according to claim 23 wherein the classification is effected by a procedure selected from the group consisting of segmentation, iterative segmentation, iterative segmentation based on a threshold value of color channel ratios, and iterative segmentation based on a threshold value of area ratios.

32. A computer readable medium having computer executable instructions for performing steps in selecting pixels in a digital image, the steps comprising:
circumscribing a region including all pixels of a portion of a digital image; and,
classifying pixels in this region into eye and non-eye pixels according to a selected channel of a plurality of pixel information channels, wherein the selected channel is selected as the channel of the plurality of channels that contains the largest number of pixels in said region that one of exceeds or does not exceed an area threshold at a predetermined measure of central tendency computed for each respective channel.

* * * * *

UNITED STATES PATENT AND TRADEMARK OFFICE
CERTIFICATE OF CORRECTION

| | | |
|---|---|---|
| PATENT NO. | : 6,980,691 B2 | Page 1 of 1 |
| APPLICATION NO. | : 09/899572 | |
| DATED | : December 27, 2005 | |
| INVENTOR(S) | : Victor Anatol'evich Nesterov et al. | |

It is certified that error appears in the above-identified patent and that said Letters Patent is hereby corrected as shown below:

Column 21, line 1, in the specification, after "the" delete "to".

Column 22, approx. line 34, delete "comer" before "rectangle," and insert -- corner --, therefor.

Column 22, approx. line 34, delete "comer" before "polygon," and insert -- corner --, therefor.

Column 22, approx. line 35, delete "comer-to-comer" and insert -- corner-to-corner --, therefor.

Column 24, approx. line 44, delete "Ymin" and insert -- $Y_{min}$ --, therefor.

Column 25, line 5, delete "is" and insert -- this --, therefor.

Column 27, line 60, in claim 22, after "defect" insert -- , --.

Column 28, line 12, in claim 24, delete "red eye" and insert -- red-eye --, therefor.

Column 28, line 33, in claim 30, delete "claim 23" and insert -- claim 29 --, therefor.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 6,980,691 B2 Page 1 of 2
APPLICATION NO. : 09/899572
DATED : December 27, 2005
INVENTOR(S) : Victor Anatol'evich Nesterov et al.

It is certified that error appears in the above-identified patent and that said Letters Patent is hereby corrected as shown below:

At page 1, column 1, line 3, under inventors, delete "Alezandrovich" and insert -- Alexandrovich --, therefor.

At page 1, column 1, line 5, under inventors, delete "Kryzstof" and insert -- Krzysztof --, therefor.

At page 1, column 2, line 18, under Abstract, after "red eye" insert -- . --.

At page 2, column 1, line 24, in the specification, after "represents" delete "a".

At page 3, column 4, line 28, in the specification, delete "channel."." and insert -- channel". --, therefor.

At page 3, column 4, line 42, in the specification, delete "key[usually" and insert -- key [usually --, therefor.

At page 6, column 10, line 8, in the specification, delete "I" and insert -- It --, therefor.

At page 7, column 12, line 28, in the specification, delete "ratios" before "ratio".

At page 7, column 12, line 64, in the specification, after "of the" delete "of the".

At page 7, column 12, line 66, in the specification, after "pixels" insert -- is --.

At page 10, column 17, approx. line 57, in the specification, delete "comer" and insert -- corner --, therefor.

Column 21, line 1, in the specification, after "the" delete "to".

Column 22, approx. line 34, delete "comer" before "rectangle," and insert -- corner --, therefor.

Column 22, approx. line 34, delete "comer" before "polygon," and insert -- corner --, therefor.

This certificate supersedes the Certificate of Correction issued June 15, 2010.

Signed and Sealed this

Third Day of August, 2010

David J. Kappos
*Director of the United States Patent and Trademark Office*

Column 22, approx. line 35, delete "comer-to-comer" and insert -- corner-to-corner --, therefor.

Column 24, approx. line 44, delete "Ymin" and insert -- $Y_{min}$ --, therefor.

Column 25, line 5, delete "is" and insert -- this --, therefor.

Column 27, line 60, in claim 22, after "defect" insert -- , --.

Column 28, line 12, in claim 24, delete "red eye" and insert -- red-eye --, therefor.

Column 28, line 33, in claim 30, delete "claim 23" and insert -- claim 29 --, therefor.